United States Patent
Belghoul et al.

(10) Patent No.: US 10,512,002 B2
(45) Date of Patent: Dec. 17, 2019

(54) LOSSLESS SPLIT DATA BEARER FOR INTER-RAT DUAL CONNECTIVITY WIRELESS DEVICE

(71) Applicant: Apple Inc., Cupertino, CA (US)

(72) Inventors: Farouk Belghoul, Campbell, CA (US); Christian W. Mucke, Cupertino, CA (US); Thierry Derand, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/919,371

(22) Filed: Mar. 13, 2018

(65) Prior Publication Data

US 2018/0376383 A1 Dec. 27, 2018

Related U.S. Application Data

(60) Provisional application No. 62/524,169, filed on Jun. 23, 2017.

(51) Int. Cl.
  *H04W 36/00* (2009.01)
  *H04W 36/06* (2009.01)
  (Continued)

(52) U.S. Cl.
  CPC ....... *H04W 36/0022* (2013.01); *H04W 36/06* (2013.01); *H04W 36/28* (2013.01);
  (Continued)

(58) Field of Classification Search
  CPC . H04W 36/0022; H04W 76/15; H04W 36/06; H04W 28/085; H04W 72/0486;
  (Continued)

(56) References Cited

U.S. PATENT DOCUMENTS

| | | | |
|---|---|---|---|
| 8,805,375 B2 * | 8/2014 | Periyalwar | H04W 88/06 455/436 |
| 9,380,642 B2 * | 6/2016 | Periyalwar | H04W 48/18 |
| 2012/0289170 A1 * | 11/2012 | Li | H04W 72/085 455/73 |
| 2014/0328182 A1 * | 11/2014 | Gao | H04W 28/08 370/236 |

(Continued)

FOREIGN PATENT DOCUMENTS

| WO | WO 2017/027053 A1 | 2/2017 |
|---|---|---|
| WO | WO 2017/164901 A1 | 9/2017 |

OTHER PUBLICATIONS

Rosa et al; "Dual Connectivity for LTE Small Cell Evolution: Functionality and Performance Aspects"; Print ISSN: 0163-6804; IEEE Communications Magazine (vol. 54, Issue: 6); Jun. 23, 2016; pp. 137-143.

*Primary Examiner* — Brian T O Connor
(74) *Attorney, Agent, or Firm* — Kowert Hood Munyon Rankin & Goetzel, P.C.; Jeffrey C. Hood; Joel L. Stevens

(57) ABSTRACT

Apparatuses, systems, and methods for a wireless device to manage an uplink bearer that utilizes concurrent inter-RAT dual uplink connectivity to avoid packet loss during bearer switch, handover, and/or radio link failure occasions. The wireless device may establish a first wireless link according to a first radio access technology (RAT) and a second wireless link according to a second RAT. A data bearer may be established that utilizes both the first wireless link and the second wireless link. Uplink data packets of the data bearer that are provided to a protocol stack for the second RAT may be stored in a buffer. The second wireless link may be lost. The stored uplink data packets that were provided to the protocol stack for the second RAT may be provided to a protocol stack for the first RAT based at least in part on the second wireless link being lost.

20 Claims, 12 Drawing Sheets

(51) Int. Cl.
| | |
|---|---|
| *H04W 76/15* | (2018.01) |
| *H04W 36/28* | (2009.01) |
| *H04W 88/06* | (2009.01) |
| *H04W 72/04* | (2009.01) |
| *H04W 8/08* | (2009.01) |
| *H04W 16/14* | (2009.01) |
| *H04W 84/12* | (2009.01) |
| *H04W 28/08* | (2009.01) |
| *H04L 12/26* | (2006.01) |
| *H04W 36/02* | (2009.01) |
| *H04W 36/14* | (2009.01) |
| *H04W 36/30* | (2009.01) |

(52) U.S. Cl.
CPC ......... *H04W 76/15* (2018.02); *H04L 43/0882* (2013.01); *H04W 8/08* (2013.01); *H04W 16/14* (2013.01); *H04W 28/085* (2013.01); *H04W 36/023* (2013.01); *H04W 36/14* (2013.01); *H04W 36/305* (2018.08); *H04W 72/0486* (2013.01); *H04W 84/12* (2013.01); *H04W 88/06* (2013.01)

(58) Field of Classification Search
CPC ....... H04W 84/12; H04W 16/14; H04W 8/08; H04W 88/06; H04L 43/0882
See application file for complete search history.

(56) References Cited

U.S. PATENT DOCUMENTS

| | | | |
|---|---|---|---|
| 2015/0133122 A1* | 5/2015 | Chen | H04W 36/04 455/436 |
| 2015/0208286 A1* | 7/2015 | Ozturk | H04W 36/0022 370/331 |
| 2016/0021673 A1* | 1/2016 | Ahmadzadeh | H04W 72/085 370/331 |
| 2016/0088542 A1 | 3/2016 | Belghoul et al. | |
| 2016/0255551 A1 | 9/2016 | Susitaival et al. | |
| 2016/0286472 A1* | 9/2016 | Periyalwar | H04W 48/18 |
| 2016/0338068 A1* | 11/2016 | Cheng | H04W 88/06 |
| 2017/0078890 A1* | 3/2017 | Zhu | H04W 16/14 |
| 2017/0164221 A1* | 6/2017 | Tan Bergstrom | H04W 76/18 |
| 2017/0181035 A1* | 6/2017 | Gao | H04W 28/08 |
| 2017/0272217 A1* | 9/2017 | Li | H04W 28/08 |
| 2017/0367007 A1* | 12/2017 | Sirotkin | H04L 63/0428 |
| 2017/0374579 A1* | 12/2017 | Wang | H04W 28/08 |
| 2018/0049208 A1* | 2/2018 | Ozturk | H04W 28/085 |
| 2018/0124647 A1* | 5/2018 | Dai | H04W 72/08 |
| 2018/0199354 A1* | 7/2018 | Yi | H04W 28/02 |
| 2018/0206282 A1* | 7/2018 | Singh | H04W 88/06 |
| 2018/0220470 A1* | 8/2018 | Zacharias | H04W 76/15 |
| 2018/0279359 A1* | 9/2018 | Liu | H04W 28/0278 |
| 2018/0324714 A1* | 11/2018 | Yang | H04W 72/10 |
| 2018/0352503 A1* | 12/2018 | Periyalwar | H04W 48/18 |
| 2019/0007869 A9* | 1/2019 | Sirotkin | H04W 88/06 |
| 2019/0021026 A1* | 1/2019 | Iskander | H04W 76/16 |
| 2019/0028935 A1* | 1/2019 | Cai | H04W 36/0033 |

* cited by examiner

LOSSLESS SPLIT DATA BEARER FOR INTER-RAT DUAL CONNECTIVITY WIRELESS DEVICE

PRIORITY INFORMATION

This application claims priority to U.S. provisional patent application Ser. No. 62/524,169, entitled "Lossless Split Data Bearer for Inter-RAT Dual Connectivity UE," filed Jun. 23, 2017, which is hereby incorporated by reference in its entirety as though fully and completely set forth herein.

FIELD

The present application relates to wireless devices, and more particularly to apparatus, systems, and methods for a wireless device to manage uplink bearers that utilize concurrent connections with multiple radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

In many instances, a wireless device may be able to communicate using multiple such technologies. However, determining how best to utilize multiple wireless communication technologies together in a wireless device in a complementary manner may be a complex task. Thus, improvements in the field are desired.

SUMMARY

Embodiments relate to apparatuses, systems, and methods to perform attachment of a wireless device to concurrent (or substantially concurrent) connections with a next generation network node (e.g., a fifth generation new radio (5G NR) network node) and a legacy network node (e.g., an LTE network node).

According to some embodiments, a wireless device may include a first radio in communication with a first antenna and a second radio in communication with a second antenna. The first radio may be configured to perform cellular communication according to a first radio access technology (RAT) and the second radio may be configured to perform cellular communication according to a second RAT.

According to some embodiments, the wireless device may utilize techniques for managing an uplink bearer that utilizes concurrent inter-RAT dual uplink connectivity to avoid packet loss during bearer switch, handover, and/or radio link failure occasions.

The techniques may include maintaining a buffer for packets that have been provided to the protocol stack(s) of one or multiple RATs, e.g., if they are considered at potential risk of radio link failure. The buffer may be maintained at any of various protocol layers of the wireless device, e.g., including Internet Protocol layer, Packet Data Convergence Protocol layer, and/or a Radio Link Control layers of the wireless device.

Further, the wireless device may implement a mechanism for determining when certain data that was provided to the protocol stack of a RAT is not able to be successfully transmitted (e.g., due to temporary or persistant radio link failure of the RAT in the current location of the wireless device), and to provide that data to the protocol stack of another RAT for transmission. This may help reduce (or potentially eliminate) the likelihood that data is lost due to a radio link failure event, which may correspondingly improve the reliability and usefulness of split bearer arrangements.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
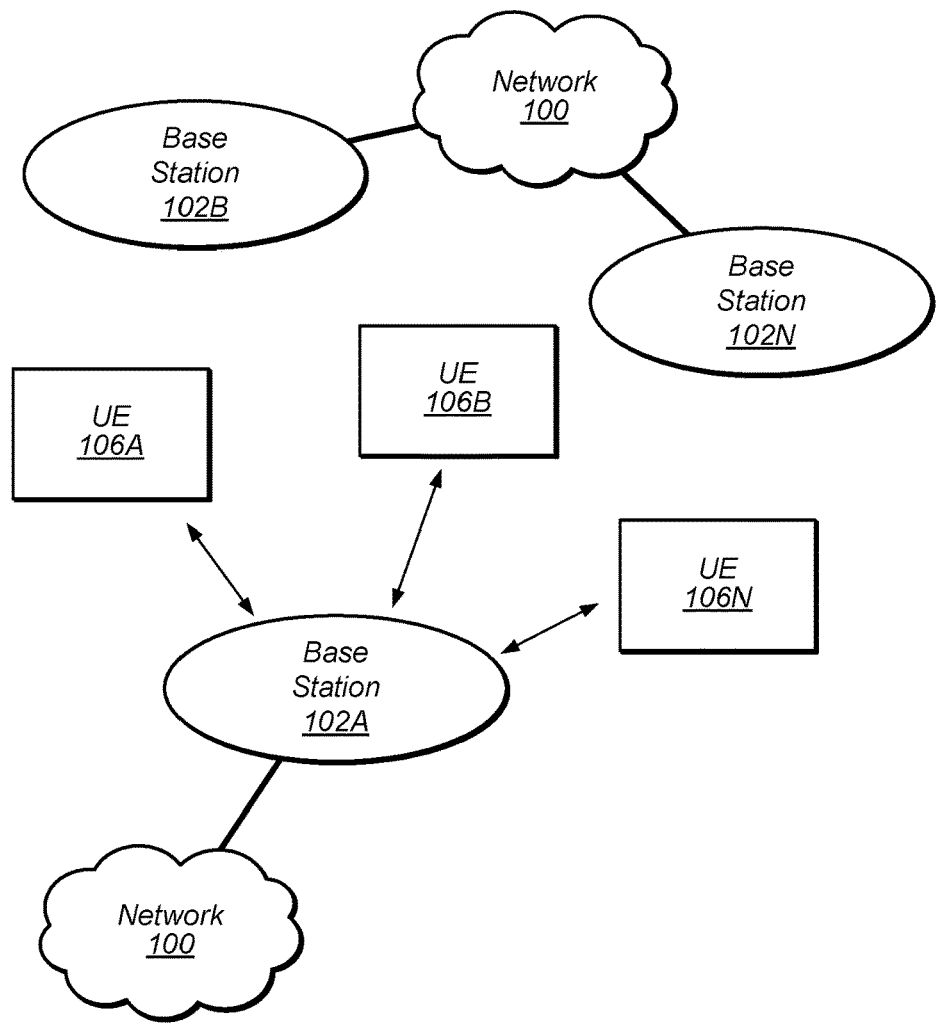
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
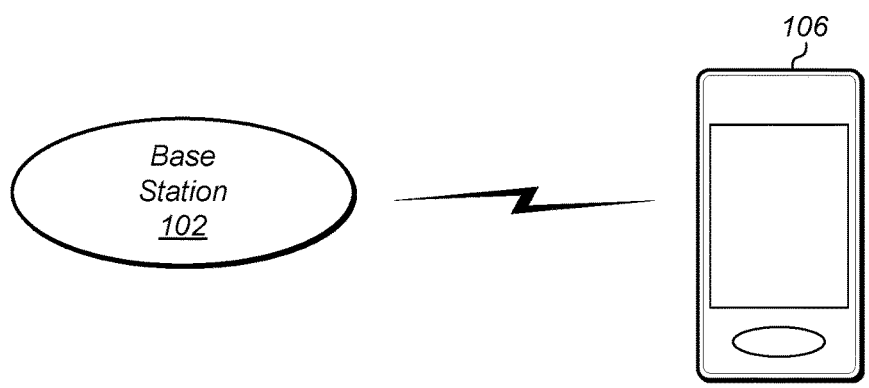
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
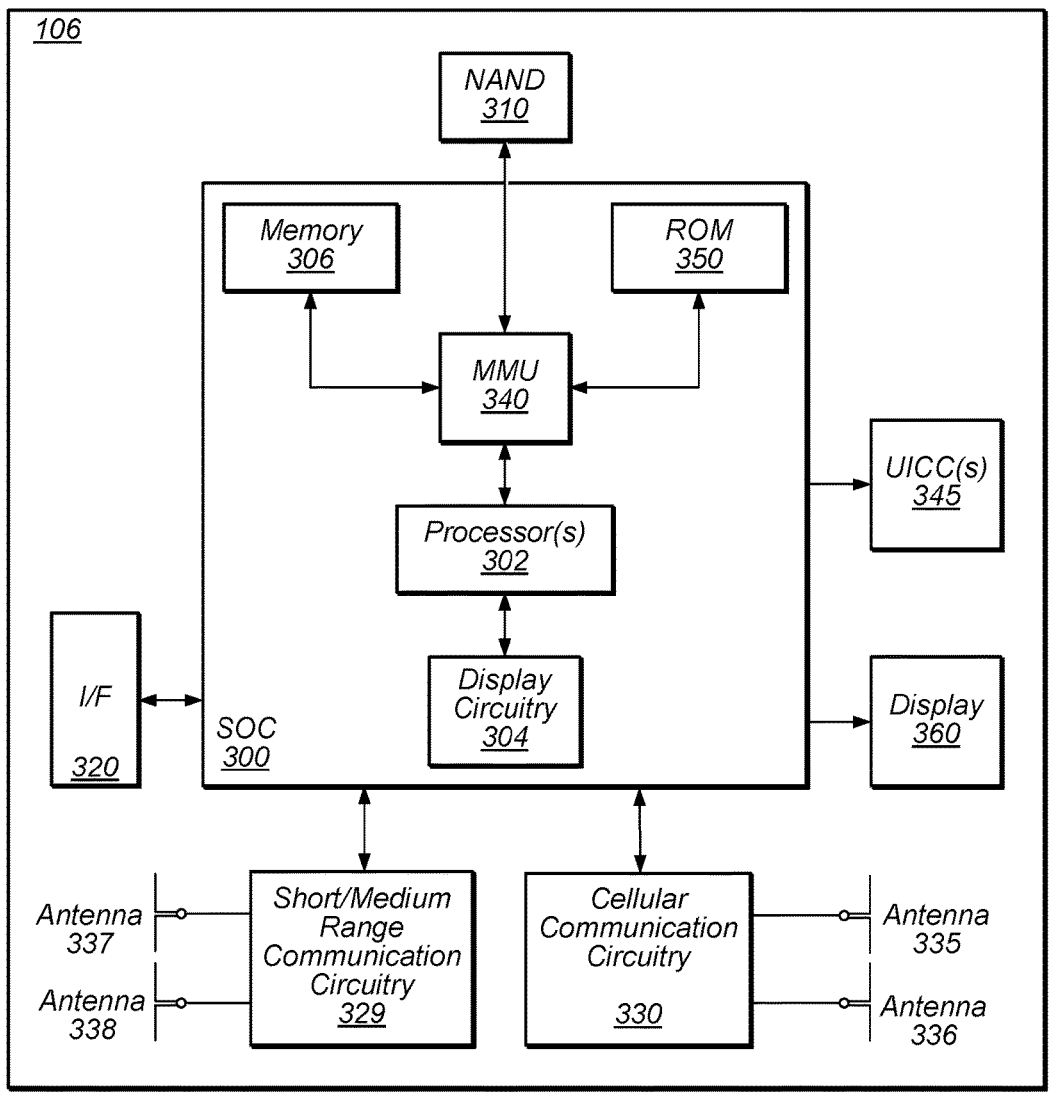
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for managing an uplink bearer that utilizes concurrent inter-RAT dual uplink connectivity to avoid packet loss during bearer switch, handover, and/or radio link failure occasions, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 335, 336, 337, 338, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
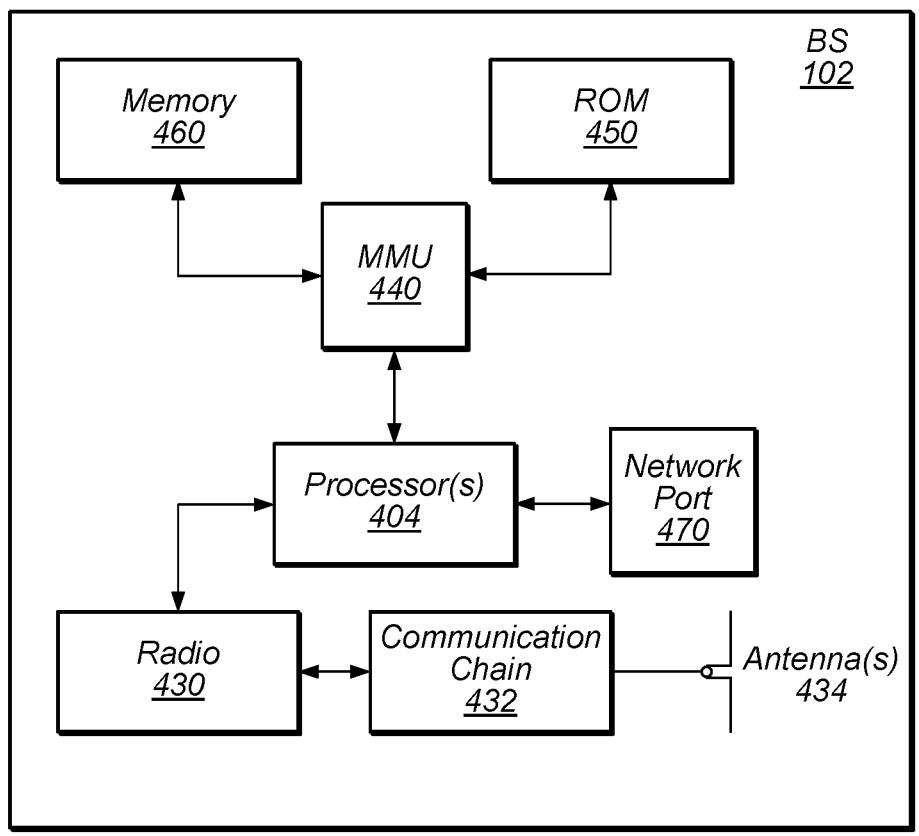
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both.

The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
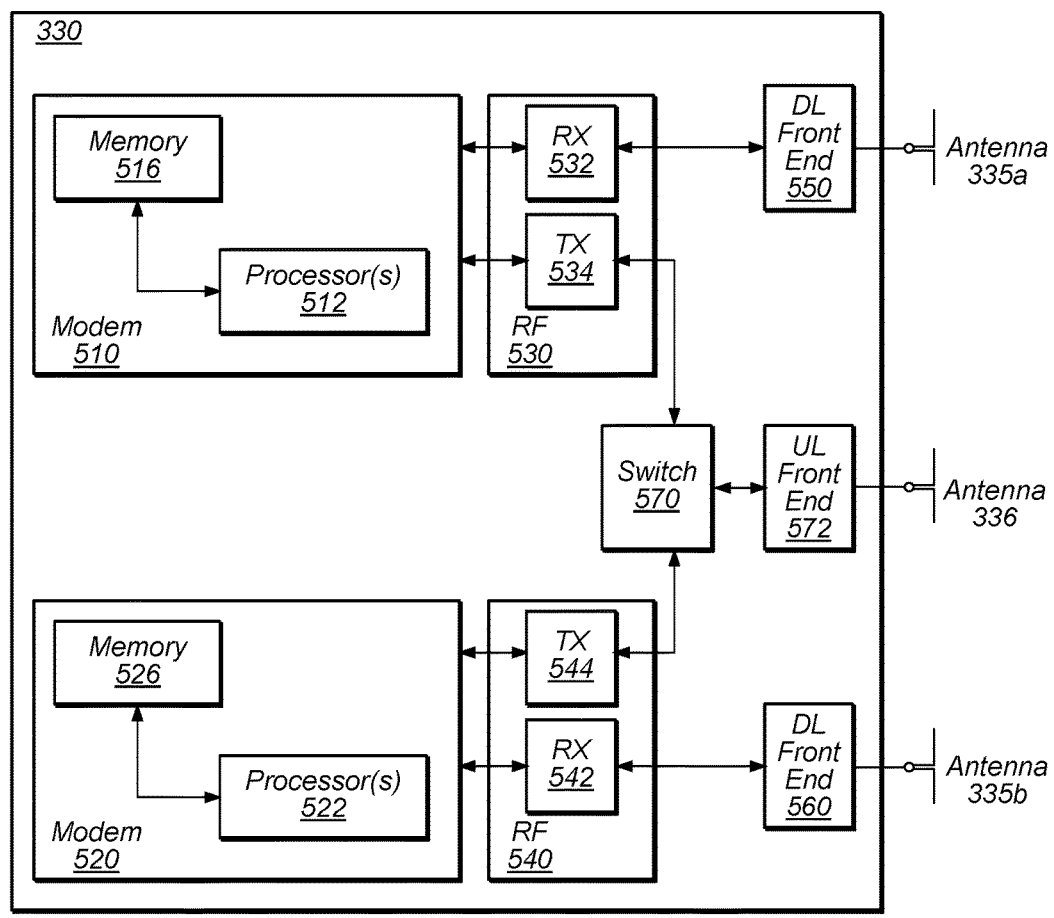
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to some embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a wearable device, a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly), dedicated processors, and/or radios for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, such as LTE or LTE-A, and modem 520 may be configured for communications according to a second RAT, such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for managing an uplink bearer that utilizes concurrent inter-RAT dual uplink connectivity to avoid packet loss during bearer switch, handover, and/or radio link failure occasions, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for managing an uplink bearer that utilizes concurrent inter-RAT dual uplink connectivity to avoid packet loss during bearer switch, handover, and/or radio link failure occasions, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
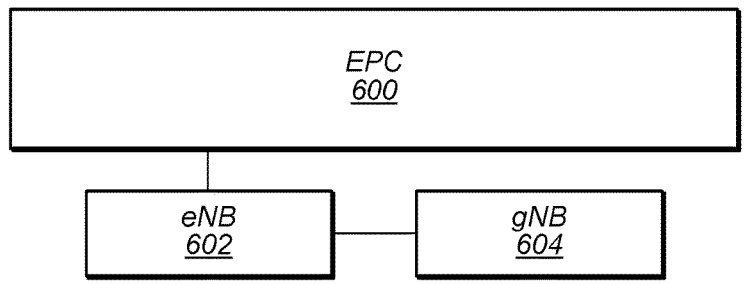
FIG. 6A illustrates an example of connections between an EPC network, an LTE base station (eNB), and a 5G NR base station (gNB), according to some embodiments.
Figure 6B:
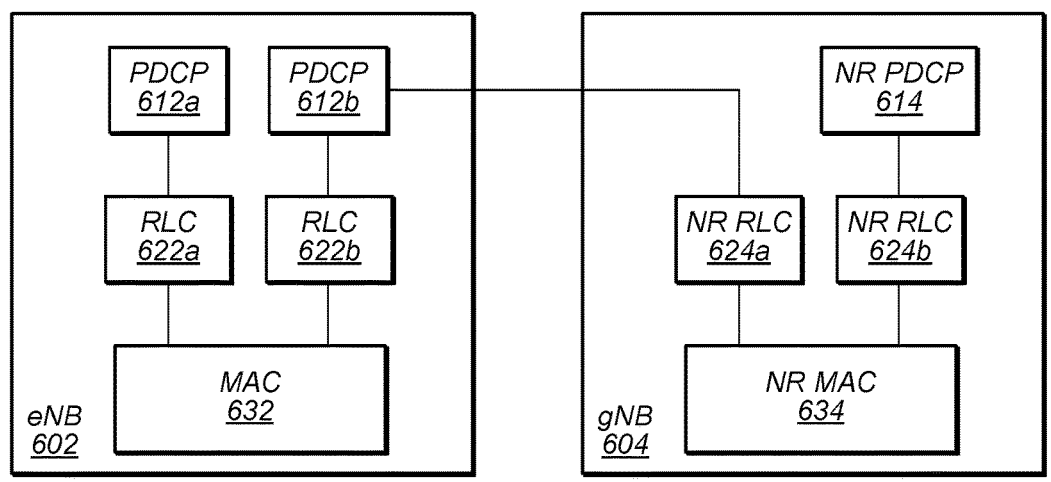
FIG. 6B illustrates an example of a protocol stack for an eNB and a gNB, according to some embodiments.

FIGS. 6A-6B—5G NR Non-standalone (NSA) Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize receiving for LTE DL band 7.

In addition, future specifications of NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers.

Note that implementations may also or alternatively allow for (substantially) simultaneous operation on two or more UL carriers at a given time. For example, if the combination of uplink frequency bands used by a UE do not produce any intermodulation products that cause receiver sensitivity degradation at the UE (or possibly if the amount receiver sensitivity degradation is within a selected threshold), the UE may be configured with multiple UL carriers on different frequencies and operate on those multiple UL carriers at the same time on at least some occasions.

Figure 7:
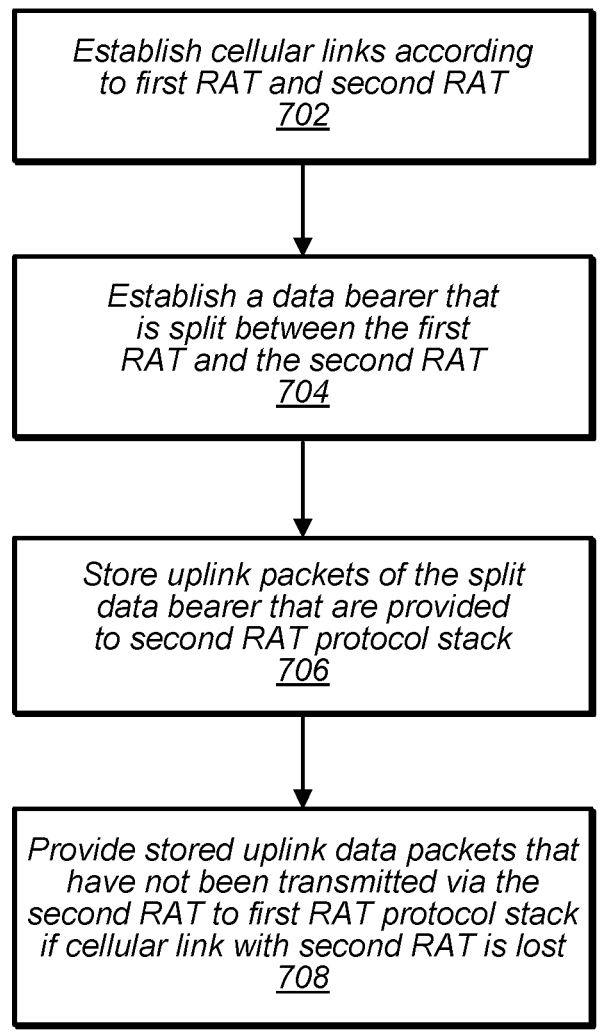
FIG. 7 is a flowchart diagram illustrating an example method for managing an uplink bearer that utilizes concurrent inter-RAT dual uplink connectivity to avoid packet loss, according to some embodiments.

FIG. 7—Lossless Split Data Bearer on Switching, Handover, and/or Radio Link Failure FIG. 7 is a flowchart diagram illustrating an example method for a wireless device to manage an split bearer that utilizes concurrent inter-RAT dual connectivity to avoid packet loss during bearer switch, handover, and/or radio link failure occasions. Aspects of the method of FIG. 7 may be implemented by a wireless device such as a UE 106 illustrated in various of the Figures herein, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional elements may also be performed as desired. As shown, the method may operate as follows.

At 702, the wireless device may establish cellular links according to a first RAT and a second RAT. This may include attaching to a first base station that operates according to the first RAT, which may provide a first cell operating in a first system bandwidth (e.g., including a first carrier frequency). This may further include attaching to a second base station that operates according to the second RAT, which may provide a second cell operating in a second system bandwidth (e.g., including a second carrier frequency), which may be different than (e.g., non-overlapping with) the first system bandwidth. Note that the first base station and the second base station may be different physical base stations or may be provided by the same physical base station and may differ only logically (e.g., a base station may be capable of providing cells according to both the first RAT and the second RAT).

In some embodiments, one of the RATs may be LTE and the other RAT may be NR; for example, the first RAT may be LTE and the second RAT may be NR, or the first RAT may be NR and the second RAT may be LTE. The order in which the cellular links are established may be arbitrary or may depend on any of various considerations, potentially including network architecture (e.g., if one of the base stations is intended for NSA operation and/or is a secondary base station), relative signal strength, relative priority level, etc. As one possibility, the wireless device may initially transmit signaling to an LTE base station, such as eNB 602 described previously herein, to establish an attachment to an LTE network. In other words, the wireless device may request a connection with the LTE base station.

In some embodiments, prior to transmitting the message, the wireless device may couple (e.g., via a switch) an uplink antenna to a transmit chain dedicated to LTE uplink transmissions, e.g., as described above in reference to FIG. 5. Alternatively, at least according to some embodiments, the wireless device may include sufficient uplink antennas that LTE and 5G NR uplink activities can be performed concurrently using separate antennas.

Continuing with the preceding example, in some instances the wireless device may transmit signaling to a 5G NR base station, such as gNB 604 described previously herein, to establish an attachment to a 5G NR network. In other words, the wireless device may request a connection with the 5G NR base station. In some embodiments, prior to transmitting the signaling, the wireless device may couple (e.g., via a switch) an uplink antenna to a transmit chain dedicated to 5G NR uplink transmissions, e.g., as described above in reference to FIG. 5. Alternatively, as previously noted, the wireless device may include sufficient uplink antennas that LTE and 5G NR uplink activities can be performed concurrently using separate antennas.

In some instances, the wireless device may receive an indication (e.g., from the LTE base station) that dual connectivity has been established. In other words, the wireless device may receive a message including one or more bits indicating that a connection with both the LTE base station and the 5G NR base station has been established. In some embodiments, the UE may receive the indication via a downlink antenna coupled to a receive chain dedicated to receiving LTE downlink transmissions, e.g., as described above in reference to FIG. 5.

At least according to some embodiments, the cellular link according to the second RAT may utilize millimeter wave spectrum (e.g., 30-300 GHz), may be established in a frequency range that is sensitive to line-of-sight path clarity, and/or otherwise may be subject to unpredictable and/or sudden loss of the cellular link.

In 704, a data bearer may be established that is split between the first RAT and the second RAT. In other words, the split data bearer may utilize both the first wireless link with the first cell and the second wireless link with the second cell. For example, the wireless device may provide some uplink data packets of the split data bearer (e.g., from a dual-connectivity (DC) packet data convergence protocol (PDCP) layer or other protocol layer at which the data bearer split occurs) to a protocol stack for the first RAT for over-the-air transmission via the first RAT and some uplink data packets of the split data bearer to a protocol stack for the second RAT for over-the-air transmission via the second RAT.

In 706, uplink packets of the split data bearer that are provided to the protocol stack for the second RAT may be stored, e.g., in a buffer. Buffering the uplink packets of the split data bearer that are provided to the protocol stack for the second RAT may help avoid packet loss, e.g., in case of sudden and/or unexpected loss of the cellular link according to the second RAT, in particular if the cellular link according to the second RAT is not recovered relatively quickly. For example, as further described subsequently herein, buffering the uplink packets of the split data bearer that are provided to the protocol stack for the second RAT may allow for those uplink packets to be recovered and transmitted via the first RAT in case of failure of the cellular link according to the second RAT.

If desired, buffering uplink packets of the split data bearer may be performed for just one of the RATs (e.g., just the second RAT), for example if one of the RATs is considered more likely to be susceptible to service interruptions. Such a scenario might occur if one RAT is deployed on millimeter wave spectrum and the other RAT is deployed on a different (e.g., lower frequency) spectrum portion that is less susceptible to service interruptions, as one possibility. Alternatively, buffering uplink packets of the split data bearer may be performed for both of the RATs (e.g., both the first RAT and the second RAT), e.g., if both RATs are considered likely to be susceptible to service interruptions and/or otherwise to reduce likelihood of packet loss.

The uplink packets of the split data bearer that are provided to the protocol stack for the second RAT may be buffered at any of various logical or physical portions of the wireless device. As one possibility, the uplink data packets of the split data bearer that are provided to the protocol stack for the second RAT may be stored in a buffer associated with a DC-PDCP layer of the wireless device. As another possibility, the uplink data packets of the split data bearer that are provided to the protocol stack for the second RAT may be stored in a radio link control (RLC) buffer associated with a RLC layer of the protocol stack for the second RAT. As a still further possibility, the uplink data packets of the split data bearer that are provided to the protocol stack for the second RAT may be stored in a buffer associated with an Internet Protocol (IP) layer of the wireless device.

According to some embodiments, as uplink packets of the split data bearer are successfully transmitted, those packets may be flushed from the buffer. For example, in a scenario in which the buffer is at the DC-PDCP layer of the wireless device, the protocol stack for the second RAT may provide an indication that an uplink data packet of the split data bearer has been successfully transmitted to the DC-PDCP layer when an uplink data packet of the split data bearer is successfully transmitted via the cellular link according to the second RAT. The DC-PDCP layer may in turn flush the uplink data packet for which the indication is received from the buffer. In a scenario in which the buffer is at the RLC layer of the second RAT's protocol stack, the RLC layer may receive an indication that an uplink data packet of the split data bearer has been successfully transmitted from the physical layer of the second RAT's protocol stack (e.g., possibly by way of one or more intermediate layers of the second RAT's protocol stack), and may in turn flush the uplink data packet for which the indication is received from the buffer. In a scenario in which the buffer is at the IP layer of the wireless device, the protocol stack for the second RAT may provide an indication that an uplink data packet of the split data bearer has been successfully transmitted to the IP layer (possibly by way of the DC-PDCP layer) when an uplink data packet of the split data bearer is successfully transmitted via the cellular link according to the second RAT. The IP layer may in turn flush the uplink data packet for which the indication is received from the buffer.

In 708, if the cellular link according to the second RAT is lost or the wireless device is otherwise unable to successfully transmit uplink data packets via the second wireless link, buffered uplink data packets that have not been transmitted via the second wireless link may be provided to a protocol stack for the first RAT, e.g., based at least in part on the loss of the cellular link according to the second RAT and/or inability to successfully transmit uplink data packets via the second wireless link. In some instances, the protocol stack for the second RAT may provide an indication to the entity at which the buffering occurs (possibly by way of one or more intermediate layers) that the cellular link according to the second RAT is lost (or otherwise that the wireless device is unable to successfully transmit uplink data packets via the second wireless link), and possibly also an indication of a packet identifier (e.g., a packet sequence number) for the last packet that was sent over the air according to the second RAT. The indication of the packet identifier for the last packet that was sent according to the second RAT may be used to determine which buffered uplink data packet(s) had not yet been transmitted via the second wireless link when the second wireless link was lost.

Thus, if the buffering occurs at the DC-PDCP layer, the DC-PDCP layer may provide the buffered packets to the protocol stack for the first RAT. If the buffering occurs at the IP layer, the IP layer may provide the buffered packets to the protocol stack for the first RAT (e.g., by way of the DC-PDCP layer). If the buffering occurs at the RLC layer of the protocol stack for the second RAT, the RLC layer of the protocol stack for the second RAT may provide the buffered packets to the protocol stack for the first RAT, possibly directly or possibly by way of the DC-PDCP layer, e.g., depending on the ciphering technique(s) used for packets provided to the first RAT protocol stack relative to packets provided to the second RAT protocol stack, whether the packets are stored at the RLC layer of the protocol stack for the second RAT before or after RLC segmentation, etc. For example, if the packets are stored at the RLC layer of the protocol stack for the second RAT before RLC segmentation (e.g., if the packets are stored as unsegmented packets by the RLC layer of the protocol stack for the second RAT) and the same (or sufficiently similar) ciphering technique is used for packets provided to the first RAT protocol stack relative to packets provided to the second RAT protocol stack, the packets may be provided from the RLC layer of the protocol stack for the second RAT directly to the RLC layer of the protocol stack for the first RAT. Alternatively, if the packets are stored at the RLC layer of the protocol stack for the second RAT after RLC segmentation or a different ciphering technique is used for packets provided to the first RAT protocol stack relative to packets provided to the second RAT protocol stack, the packets may be provided from the RLC layer of the protocol stack for the second RAT back to the DC-PDCP layer for re-formatting, and the DC-PDCP layer may re-format the packets and provide the packets to the RLC layer of the protocol stack for the first RAT after the re-formatting.

Once provided to the protocol stack for the first RAT, the previously buffered packets may be transmitted via the cellular link according to the first RAT. Thus, buffering techniques such as described herein may be used to avoid packet loss in an inter-RAT dual connectivity scenario, as packets that might otherwise have been unrecovered may still be transmitted. Such techniques may be particularly useful in scenarios in which one or more of the RATs utilize millimeter wave spectrum that is sensitive to line-of-sight paths or otherwise is subject to relatively sudden and/or unpredictable link loss, among other possible scenarios.

Note that while the techniques for managing a split bearer that utilizes concurrent inter-RAT dual connectivity to avoid packet loss described with respect to FIG. 7 are described primarily in conjunction with uplink activities by a wireless device, similar techniques may be used, e.g., by a cellular base station, to manage a split bearer that utilizes concurrent inter-RAT dual connectivity to avoid packet loss in the downlink direction, if desired.

FIGS. 8-11 and Additional Information

FIGS. 8-11 and the following additional information are provided by way of example of various considerations and details relating to possible systems in which the method of FIG. 7 and/or other aspects of this disclosure may be implemented, and are not intended to be limiting to the disclosure as a whole. Numerous variations and alternatives to the details provided herein below are possible and should be considered within the scope of the disclosure.

Figure 8:
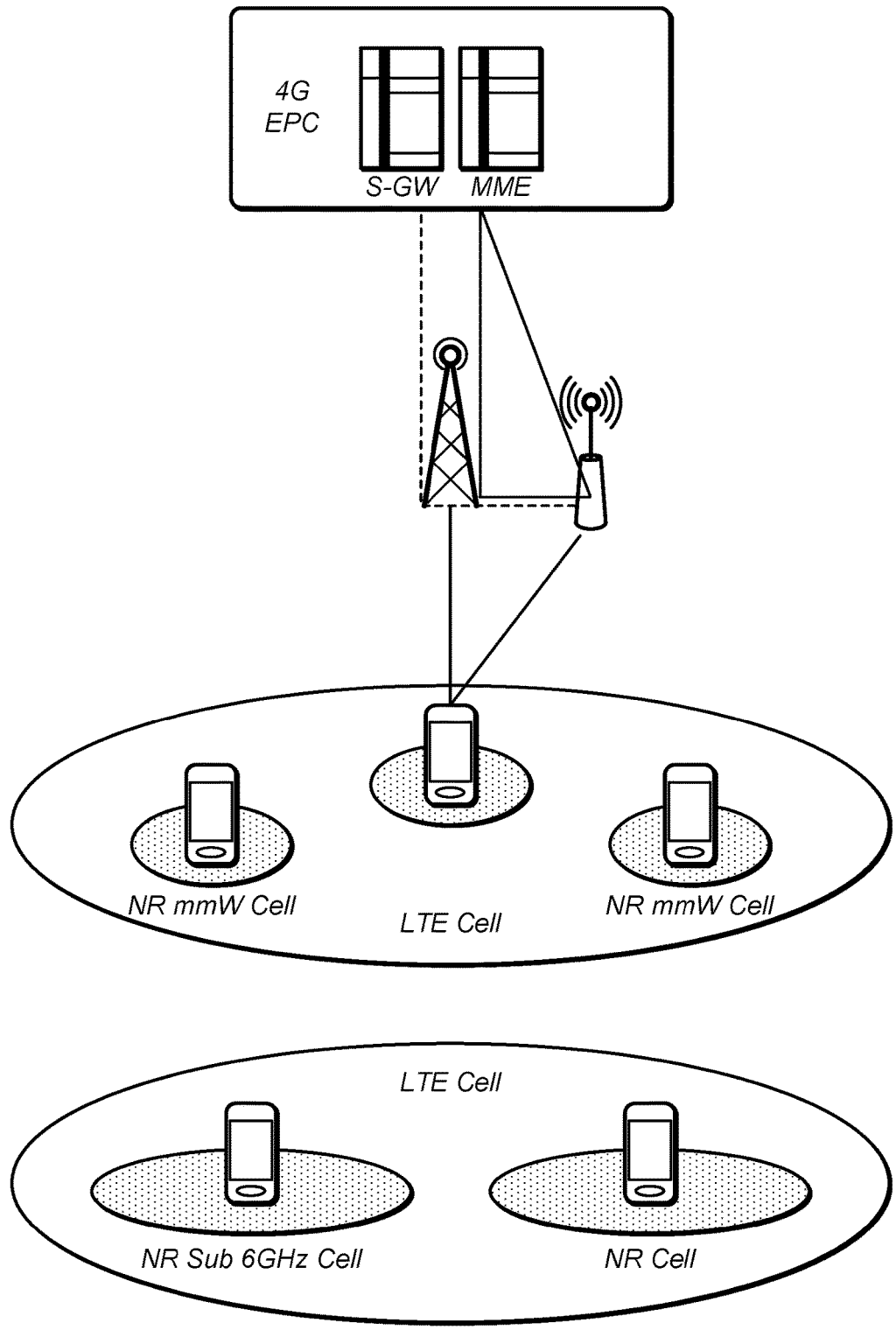
FIG. 8 illustrates aspects of an example non-standalone 5G NR deployment, according to some embodiments.

FIG. 8 illustrates exemplary aspects of a possible non-standalone 5G NR deployment, according to some embodiments. Non-standalone NR may be one possible way of deploying NR gNBs for widespread use. Such a deployment may include use of a dual-connectivity concept between LTE eNBs and NR gNBs. For example, for control plane communications, the LTE eNB may be responsible for RRC connections, and for user plane communications, either of the eNB or the gNB could be considered the central node. As shown, in some instances NR cells may include millimeter wave (mmW) cells, while in other instances NR cells may be deployed on lower frequencies (e.g., sub 6 GHz).

Figure 9A:
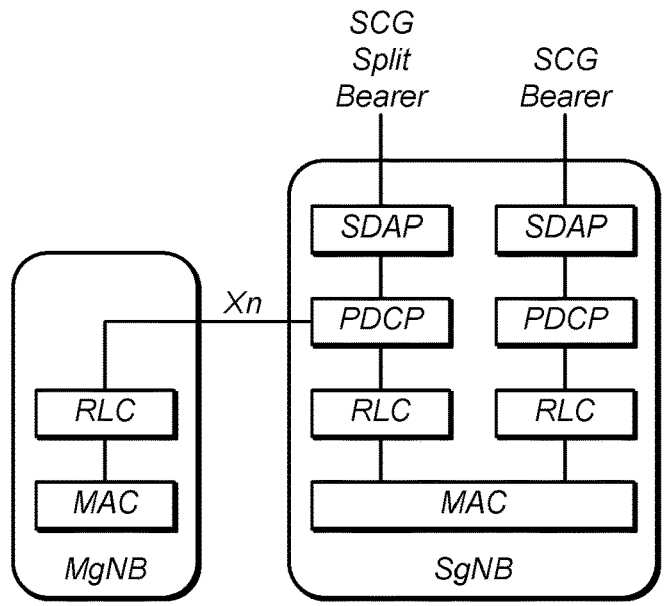
FIGS. 9A-9B illustrate examples of possible downlink/uplink bearer split configurations for dual connectivity, according to some embodiments.
Figure 9B:
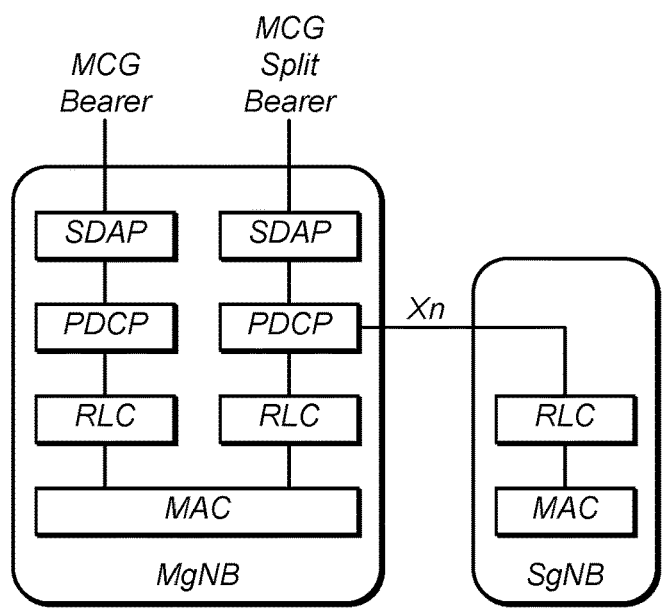

FIGS. 9A-9B illustrate examples of possible downlink/uplink bearer split configurations for dual connectivity, according to some embodiments. A split bearer may include a data bearer between a UE and a network that an eNB splits at the PDCP layer such that both the eNB and a gNB provide a portion of the data of the data bearer to the UE, which in turn may receive data of the data bearer from both the eNB and the gNB. Thus, it may represent an aggregation of LTE and NR user plane communications at the PDCP layer. When data is split at the PDCP layer, it may be buffered at the RLC layer while waiting for an indication of a grant from the MAC layer, then may transmit the packets over the air.

Figure 10:
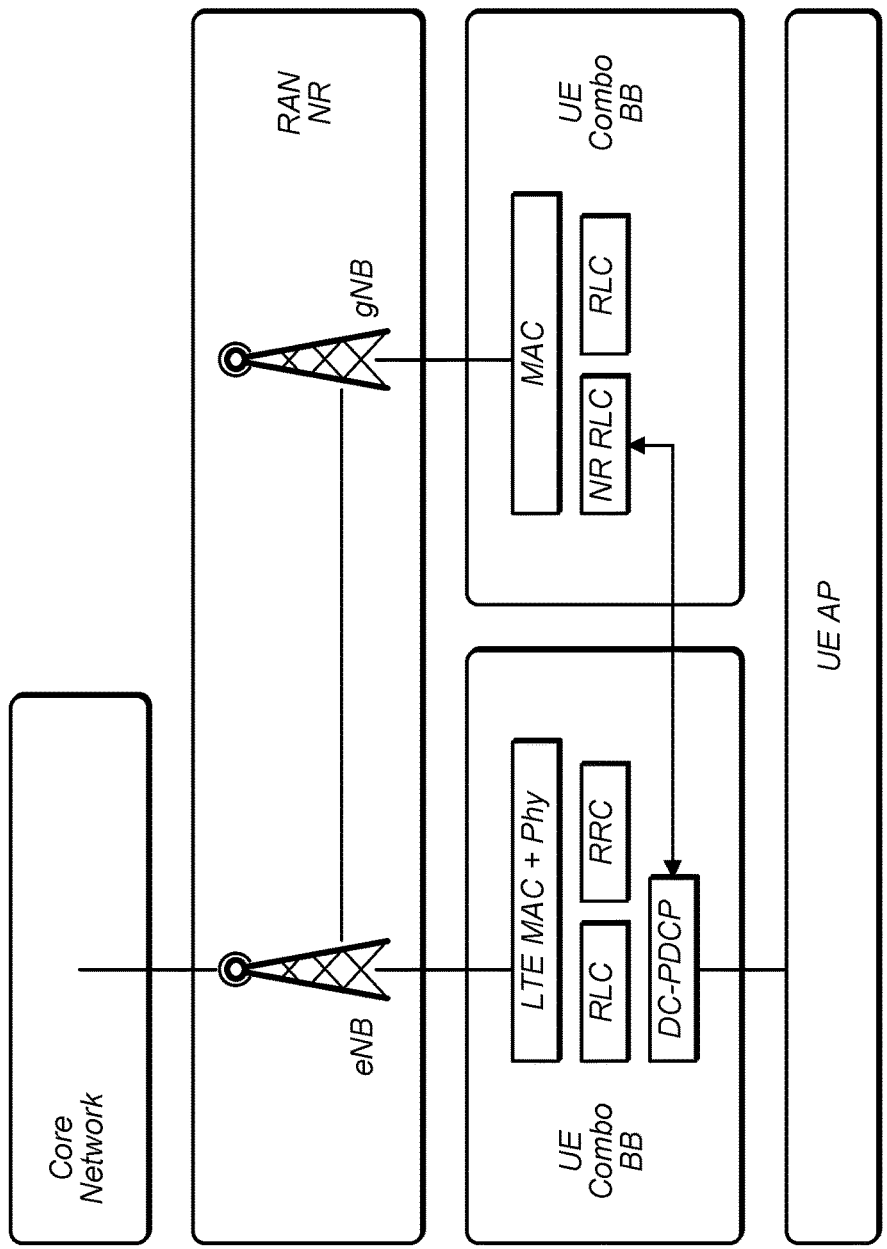
FIG. 10 illustrates an example of a possible uplink split data bearer configuration at a wireless device, according to some embodiments.

FIG. 10 illustrates an example of a possible uplink split data bearer configuration at a wireless device, according to some embodiments. For an uplink bearer, the bearer split may be performed at the UE PDCP layer, where the data of the bearer may be split between both LTE and NR. For example, if the device utilizes two different chipsets, the data may be split between two RLC modules, one in the NR chipset and the other in the LTE chipset.

As previously noted, in some instances NR cells may be deployed on mmW frequencies, which may be reliant on line-of-sight and may have potential for immediate and unpredictable link loss. As such, a dual connectivity connection of a UE with a mmW NR cell and a non-mmW LTE cell may be expected to relatively frequently fall back to the LTE link, potentially without sufficient time for network handover of the dual LTE-NR link to LTE, at least according to some embodiments.

Thus, if the uplink user plane for a UE is configured to use an uplink split bearer in such a scenario, each time there is a mmW cell disconnection, while new packets generated by user applications may be redirected to LTE, there may be potential for the UE packets already provided to the NR RLC buffers to go unrecovered. This may (e.g., for TCP traffic) result in retransmission and trigger a slow-start scheme, and/or may potentially (e.g., for UDP traffic) result in a failed file transmission.

Figure 11:
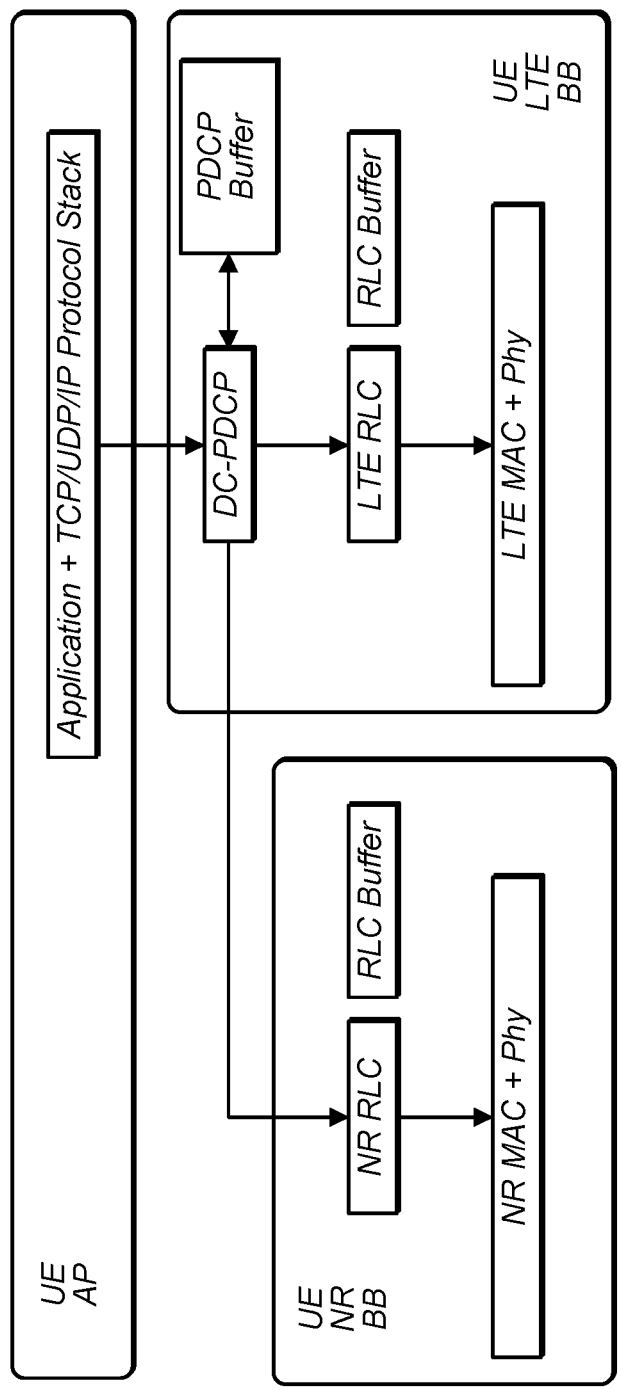
FIGS. 11-13 illustrate aspects of a wireless device protocol stack in accordance with various possible techniques for managing an uplink bearer that utilizes concurrent inter-RAT dual uplink connectivity to avoid packet loss, according to some embodiments.
Figure 12:
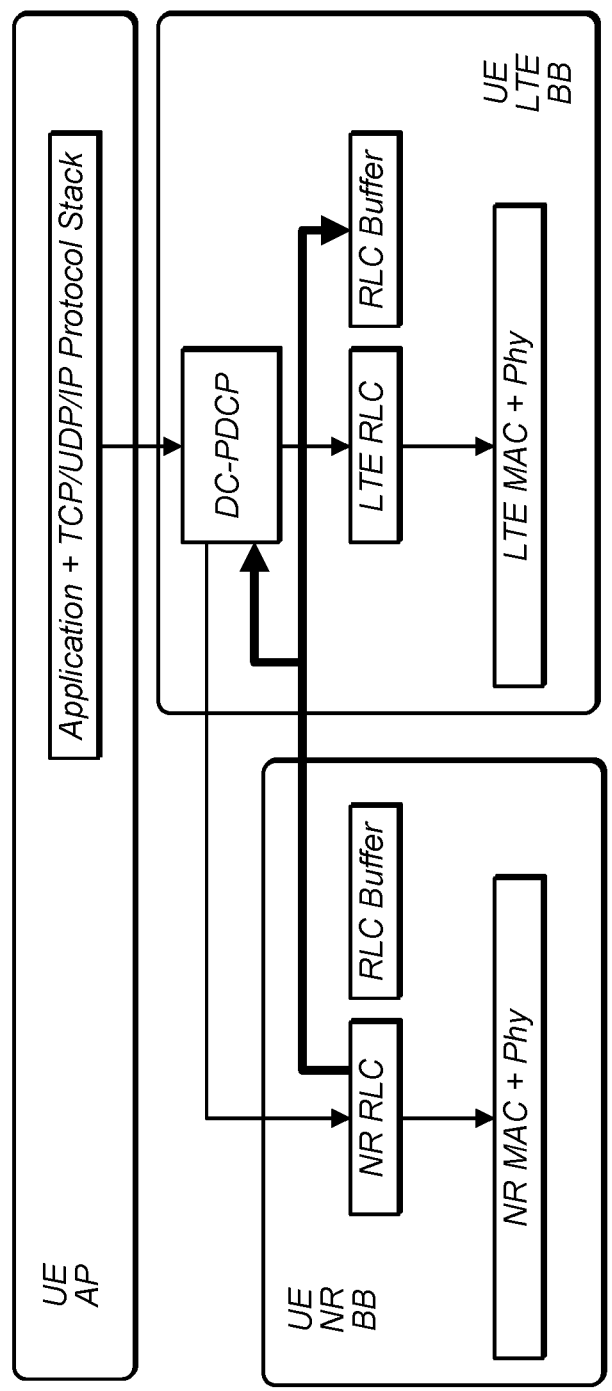
Figure 13:
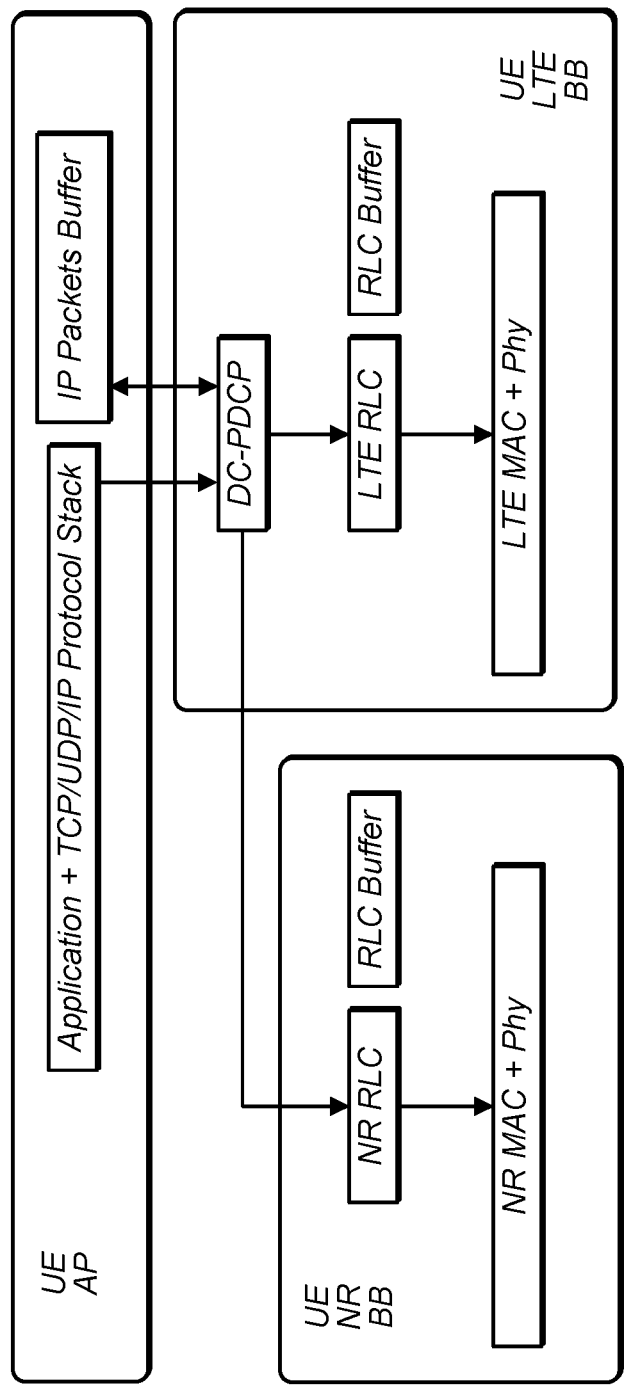

Accordingly, it may be desirable to implement a scheme to avoid such packet losses in case of unexpected link loss in a dual connectivity scenario, at least according to some embodiments. FIGS. 11-13 illustrate aspects of a UE protocol stack in accordance with various such possible techniques for managing an uplink bearer that utilizes concurrent inter-RAT dual uplink connectivity to avoid packet loss, according to some embodiments.

FIG. 11 illustrates aspects of a UE protocol stack in which mmW NR packets may be stored in a PDCP buffer until successfully sent, according to some embodiments. As shown, the PDCP buffer may be associated with the LTE DC-PDCP layer of the UE. Upon receiving packets from the application processor, the DC-PDCP layer may perform sequencing, header compression, and ciphering, and may decide how to route the packets (e.g., either via NR RLC or LTE RLC) for segmentation and buffering. In order to be able to recover what otherwise might potentially be lost packets if the NR mmW link is disconnected, the PDCP layer may duplicate and buffer all PDCP service data units (SDUs) before sending them to the NR RLC layer. Each time a packet is correctly sent via the mmW link, the NR RLC layer may send a message to the DC-PDCP layer, and the DC-PDCP layer may flush the corresponding copy from the PDCP buffer. If the NR RLC layer receives an indication from the NR PHY layer that the mmW radio link is lost and there is no other mmW beam, the NR RLC layer may provide the PDCP layer with the last sequence number of a PDCP SDU that was fully sent of the air. The PDCP layer may search the PDCP buffer for all SDUs that were previously provided to but not sent by the NR RLC layer (e.g., including any PDCP SDUs in the PDCP buffer having sequence numbers at or more recent than the last sequence number of a PDCP SDU that was fully sent of the air), and may provide these SDUs to the LTE RLC. The routing of dual connectivity SDUs to the NR RLC may further be suspended while the mmW radio link is unavailable. Thus, it may be the case that packet loss due to disappearance of the mmW link may be avoided.

FIG. 12 illustrates aspects of a UE protocol stack in which a mechanism is provided to potentially reformat and transfer mmW NR packets that are stored in the NR RLC buffer to the LTE RLC if the mmW link is lost, according to some embodiments. Upon receiving packets from the application processor, the DC-PDCP layer may perform sequencing, header compression, and ciphering, and may decide how to route the packets (e.g., either via NR RLC or LTE RLC) for segmentation and buffering. The NR RLC buffer (or both RLC buffers) may buffer packets before segmentation (e.g., the buffered packets may be unsegmented), e.g., in order to reduce the need for reformatting if packets need to be transferred between the RLC buffers. In order to be able to recover what otherwise might potentially be lost packets if the NR mmW link is disconnected, when the NR RLC layer receives an indication from the NR PHY layer that the mmW radio link is lost and there is no other mmW beam, the NR RLC layer may send all non sent non-segmented SDUs to the LTE RLC layer. The LTE RLC may subsequently send these SDUs over the LTE link, e.g., such that packet loss due to disappearance of the mmW link may be avoided. Note that as an alternative (e.g., if packets are buffered by the NR RLC after segmentation and/or if sufficiently different ciphering techniques are used by NR and LTE, when the NR RLC layer receives an indication from the NR PHY layer that the mmW radio link is lost and there is no other mmW beam, the NR RLC layer may send all non sent SDUs to the LTE DC-PDCP layer, which may perform any needed reformatting, and may provide the SDUs in turn to the LTE RLC.

FIG. 13 illustrates aspects of a UE protocol stack in which packets may be stored in an IP layer buffer until successfully sent, according to some embodiments. In such an implementation, the IP protocol stack executing on the application processor of the UE may be informed by the baseband modem if an uplink split bearer is enabled. When receiving this indication, the IP stack may buffer all IP packets before sending them to the DC-PDCP layer. In some instances, an ID may be added as a proprietary header for each packet. Upon receiving packets from the application processor, the DC-PDCP layer may perform sequencing, header compression, and ciphering, and may decide how to route the packets (e.g., either via NR RLC or LTE RLC) for segmentation and buffering. The RLC layers may inform the PDCP layer, which may in turn inform the IP stack, of packets successfully sent of the air. The IP stack may flush any such successfully sent packets from the IP layer packet buffer. In order to be able to recover what otherwise might potentially be lost packets if the NR mmW link is disconnected, when the NR RLC layer receives an indication from the NR PHY layer that the mmW radio link is lost and there is no other mmW beam, the NR RLC layer may inform the PDCP layer, which may in turn inform the IP stack, of the mmW link disconnection and the ID of the last packet transmitted over the air via the mmW link. The IP stack may provide the required packets back to the DC-PDCP layer, which may provide these packets to the LTE RLC. Thus, it may be the case that packet loss due to disappearance of the mmW link may be avoided.

In the following further exemplary embodiments are provided.

One set of embodiments may include a method, comprising: by a wireless device: establishing a first wireless link with a first cell according to a first radio access technology (RAT); establishing a second wireless link with a second cell according to a second radio access technology (RAT); establishing a split data bearer that utilizes both the first wireless link with the first cell and the second wireless link with the second cell; storing uplink data packets of the split data bearer that are provided to a protocol stack for the second RAT in a buffer, determining that the second wireless link is lost; and providing stored uplink data packets that have not been transmitted via the second wireless link to a protocol stack for the first RAT based at least in part on determining that the second wireless link is lost.

According to some embodiments, the uplink data packets of the split data bearer that are provided to the protocol stack for the second RAT are stored in a buffer of a dual-connectivity packet data convergence protocol layer of the wireless device.

According to some embodiments, the method further comprises: providing an indication that an uplink data packet of the split data bearer has been transmitted from the protocol stack for the second RAT to the dual-connectivity packet data convergence protocol layer when the uplink data packet of the split data bearer is transmitted via the second wireless link; and flushing the uplink data packet of the split data bearer from the buffer after the dual-connectivity packet data convergence protocol layer receives the indication that the uplink data packet of the split data bearer has been transmitted.

According to some embodiments, the uplink data packets of the split data bearer that are provided to the protocol stack for the second RAT are stored in a radio link control buffer of a radio link control layer of the protocol stack for the second wireless link.

According to some embodiments, the stored uplink data packets that have not been transmitted via the second wireless link are provided to a protocol stack for the first RAT via a dual-connectivity packet data convergence protocol layer of the wireless device.

According to some embodiments, the uplink data packets of the split data bearer that are provided to the protocol stack for the second RAT are stored in a buffer of an Internet Protocol (IP) layer of the wireless device.

According to some embodiments, the method further comprises: providing an indication that an uplink data packet of the split data bearer has been transmitted to the IP layer when the uplink data packet of the split data bearer is transmitted via the second wireless link; and flushing the uplink data packet of the split data bearer from the buffer after the IP layer receives the indication that the uplink data packet of the split data bearer has been transmitted.

According to some embodiments, the first RAT comprises LTE, and the second RAT comprises 5G NR.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
 a processing element configured to cause a wireless device to:
  establish a first wireless link with a first cell according to a first radio access technology (RAT);
  establish a second wireless link with a second cell according to a second RAT;

establish a split data bearer that utilizes both the first wireless link with the first cell and the second wireless link with the second cell;

store uplink data packets of the split data bearer that are provided to a protocol stack for the second RAT in a buffer, determine that the second wireless link is lost; and provide the stored uplink data packets that were provided to the protocol stack for the second RAT to a protocol stack for the first RAT based at least in part on determining that the second wireless link is lost.

2. The apparatus of claim 1, wherein the buffer comprises a buffer of a dual-connectivity packet data convergence protocol layer of the wireless device.

3. The apparatus of claim 2, wherein the processing element is further configured to cause the packet data convergence protocol layer of the wireless device to:

receive an indication that an uplink data packet of the split data bearer has been successfully transmitted from the protocol stack for the second RAT; and flush the uplink data packet of the split data bearer from the buffer based at least in part on receiving the indication that the uplink data packet of the split data bearer has been successfully transmitted.

4. The apparatus of claim 1, wherein the buffer comprises a radio link control buffer of a radio link control layer of the protocol stack for the second wireless link, wherein said providing the stored uplink data packets comprises providing the stored uplink data packets from the protocol stack for the second wireless link.

5. The apparatus of claim 4, wherein the stored uplink data packets are provided to the protocol stack for the first RAT via a dual-connectivity packet data convergence protocol layer of the wireless device.

6. The apparatus of claim 1, wherein the buffer comprises a buffer of an Internet Protocol (IP) layer of the wireless device.

7. The apparatus of claim 6, wherein the processing element is further configured to cause the IP layer of the wireless device to:

receive an indication that an uplink data packet of the split data bearer has been successfully transmitted; and flush the uplink data packet of the split data bearer from the buffer based at least in part on receiving the indication that the uplink data packet of the split data bearer has been successfully transmitted.

8. The apparatus of claim 1, wherein the first RAT comprises LTE, wherein the second RAT comprises 5G NR.

9. A method, comprising:

by a wireless device:

establishing a first wireless link with a first cell according to a first radio access technology (RAT);

establishing a second wireless link with a second cell according to a second RAT;

establishing a split data bearer that utilizes both the first wireless link with the first cell and the second wireless link with the second cell;

storing uplink data packets of the split data bearer that are provided to a protocol stack for the second RAT in a buffer, determining that the second wireless link is lost; and providing stored uplink data packets that have not been transmitted via the second wireless link to a protocol stack for the first RAT based at least in part on determining that the second wireless link is lost.

10. The method of claim 9, wherein the uplink data packets of the split data bearer that are provided to the protocol stack for the second RAT are stored in a buffer of a dual-connectivity packet data convergence protocol layer of the wireless device.

11. The method of claim 10, wherein the method further comprises:

providing an indication that an uplink data packet of the split data bearer has been transmitted from the protocol stack for the second RAT to the dual-connectivity packet data convergence protocol layer when the uplink data packet of the split data bearer is transmitted via the second wireless link; and flushing the uplink data packet of the split data bearer from the buffer after the dual-connectivity packet data convergence protocol layer receives the indication that the uplink data packet of the split data bearer has been transmitted.

12. The method of claim 9, wherein the uplink data packets of the split data bearer that are provided to the protocol stack for the second RAT are stored in a radio link control buffer of a radio link control layer of the protocol stack for the second wireless link, wherein said providing the stored uplink data packets comprises providing the stored uplink data packets from the protocol stack for the second wireless link.

13. The method of claim 12, wherein the stored uplink data packets that have not been transmitted via the second wireless link are provided to a protocol stack for the first RAT via a dual-connectivity packet data convergence protocol layer of the wireless device.

14. The method of claim 9, wherein the uplink data packets of the split data bearer that are provided to the protocol stack for the second RAT are stored in a buffer of an Internet Protocol (IP) layer of the wireless device.

15. The method of claim 14, wherein the method further comprises:

providing an indication that an uplink data packet of the split data bearer has been successfully transmitted to the IP layer when the uplink data packet of the split data bearer is successfully transmitted via the second wireless link; and flushing the uplink data packet of the split data bearer from the buffer after the IP layer receives the indication that the uplink data packet of the split data bearer has been successfully transmitted.

16. A wireless device, comprising:

an antenna;

a radio coupled to the antenna; and a processing element coupled to the radio;

wherein the wireless device is configured to:

establish a first wireless link with a first cell according to a first radio access technology (RAT);

establish a second wireless link with a second cell according to a second RAT;

establish a data bearer that utilizes both the first wireless link with the first cell and the second wireless link with the second cell;

provide first uplink data packets associated with the data bearer to a protocol stack for the second RAT;

store the first uplink data packets in a buffer based at least in part on the first uplink data packets being provided to the protocol stack for the second RAT;
determine that the wireless device is unable to transmit the first uplink data packets via the second wireless link; and
provide the first uplink data packets to a protocol stack for the first RAT based at least in part on determining that the wireless device is unable to transmit the first uplink data packets via the second wireless link.

17. The wireless device of claim 16,
provide second uplink data packets associated with the data bearer to the protocol stack for the second RAT;
store the second uplink data packets in a buffer based at least in part on the second uplink data packets being provided to the protocol stack for the second RAT;
determine that the second uplink data packets have been successfully transmitted via the second wireless link; and
flush the second uplink data packets from the buffer based at least in part on determining that the second uplink data packets have been successfully transmitted via the second wireless link.

18. The wireless device of claim 16, wherein the buffer is stored at one of:
   a dual-connectivity packet data convergence protocol layer of the wireless device;
   a radio link control buffer of a radio link control layer of the protocol stack for the second wireless link; or
   an Internet Protocol (IP) layer of the wireless device.

19. The wireless device of claim 18,
wherein if the buffer is stored at the radio link control layer of the protocol stack for the second wireless link, the first uplink data packets are stored as unsegmented packets by the radio link control layer of the protocol stack for the second wireless link.

20. The wireless device of claim 18, wherein if the buffer is stored at the IP layer of the wireless device, a dual-connectivity packet data convergence protocol layer of the wireless device is further configured to:
   provide an indication to the IP layer that the wireless device is unable to transmit the first uplink data packets via the second wireless link;
   receive the first uplink data packets from the IP layer; and
   provide the first uplink data packets to the protocol stack for the first RAT.

* * * * *